United States Patent
Shimasaki et al.

(10) Patent No.: US 6,862,399 B2
(45) Date of Patent: Mar. 1, 2005

(54) VIDEO REPRODUCTION APPARATUS

(75) Inventors: Takashi Shimasaki, Takefu (JP); Masato Shimizu, Takefu (JP)

(73) Assignee: Orion Electric Company, Ltd., Fukui-ken (JP)

( * ) Notice: Subject to any disclaimer, the term of this patent is extended or adjusted under 35 U.S.C. 154(b) by 0 days.

(21) Appl. No.: 10/766,186

(22) Filed: Jan. 29, 2004

(65) Prior Publication Data

US 2004/0184790 A1 Sep. 23, 2004

(30) Foreign Application Priority Data

Jan. 31, 2003 (JP) .......................... 2003-023173

(51) Int. Cl.[7] ................................................ H04N 5/91
(52) U.S. Cl. ..................... 386/68; 386/126; 386/131; 348/555
(58) Field of Search ...................... 386/46, 131, 68, 386/70, 125–126; 348/553, 554, 555, 556; H04N 5/91

(56) References Cited

U.S. PATENT DOCUMENTS

| | | | | |
|---|---|---|---|---|
| 5,754,248 | A | * | 5/1998 | Faroudja ...................... 386/123 |
| 6,069,607 | A | * | 5/2000 | Everett et al. ............... 345/660 |
| 6,205,288 | B1 | * | 3/2001 | Gong ........................... 386/131 |
| 6,363,204 | B1 | * | 3/2002 | Johnson et al. ............... 386/68 |
| 6,366,329 | B1 | * | 4/2002 | Oh .............................. 348/554 |
| 6,370,198 | B1 | * | 4/2002 | Washino ....................... 348/555 |
| 6,542,196 | B1 | * | 4/2003 | Watkins ....................... 348/448 |

FOREIGN PATENT DOCUMENTS

| | | |
|---|---|---|
| JP | 10-341452 | 6/1997 |
| JP | 2002-247520 | 2/2001 |

* cited by examiner

*Primary Examiner*—Vincent Boccio
(74) *Attorney, Agent, or Firm*—Reed Smith LLP; Stanley P. Fischer, Esq.; Juan Carlos A. Marquez, Esq.

(57) ABSTRACT

An object of this invention is to provide a video reproduction apparatus capable of promptly actuating a television receiver and displaying a video or the like by simple operation even if a user erroneously inputs a system of the television receiver. The video reproduction apparatus 15 includes a disk reproduction portion 1 that reproduces a video recorded on a DVD, a video encoder 3, a microcomputer 5, and an operation remote controller 11. The video encoder 3 includes a first signal formation circuit 3a that forms an input signal into a first output signal based on a progressive system and a second signal formation circuit 3b that forms the input signal into a second output signal based on an interlaced system. If the user erroneously sets the system of the television receiver 17 connected to the video reproduction apparatus 15 at the progressive system, the microcomputer 5 controls the video encoder 3 to change over a circuit that processes the input signal from the first signal formation circuit 3a to the second signal formation circuit 3b by user's operation of stopping an operation of the disk reproduction portion 1 using the operation remote controller 11.

2 Claims, 3 Drawing Sheets

[FIG. 1]
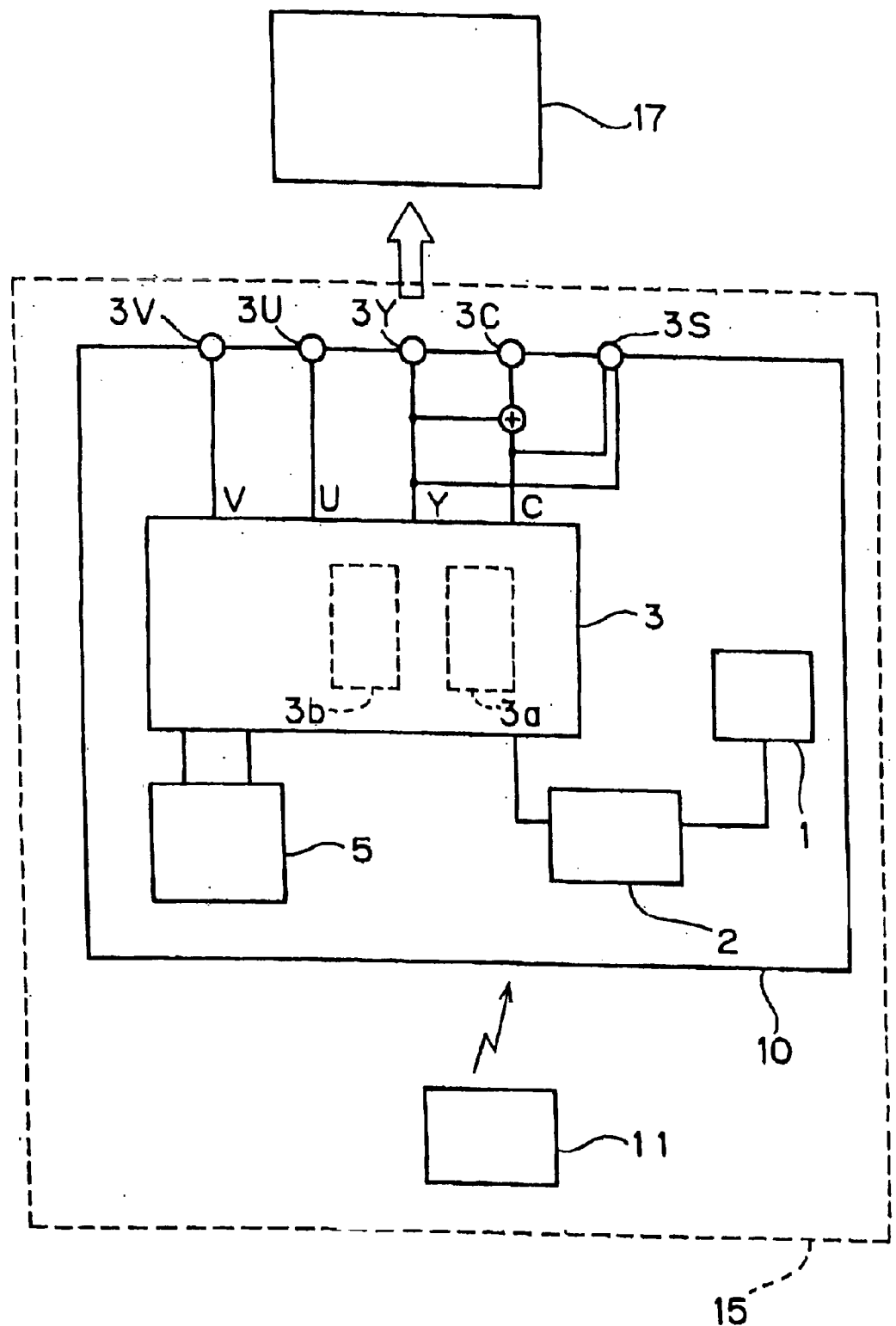

[FIG. 2]

```
MENU

CLOCK SETTING

RECORDING RESERVATION

■ PROGRESSIVE OUTPUT   ▲ ON OFF

CHANNEL SETTING
```

[FIG. 3]
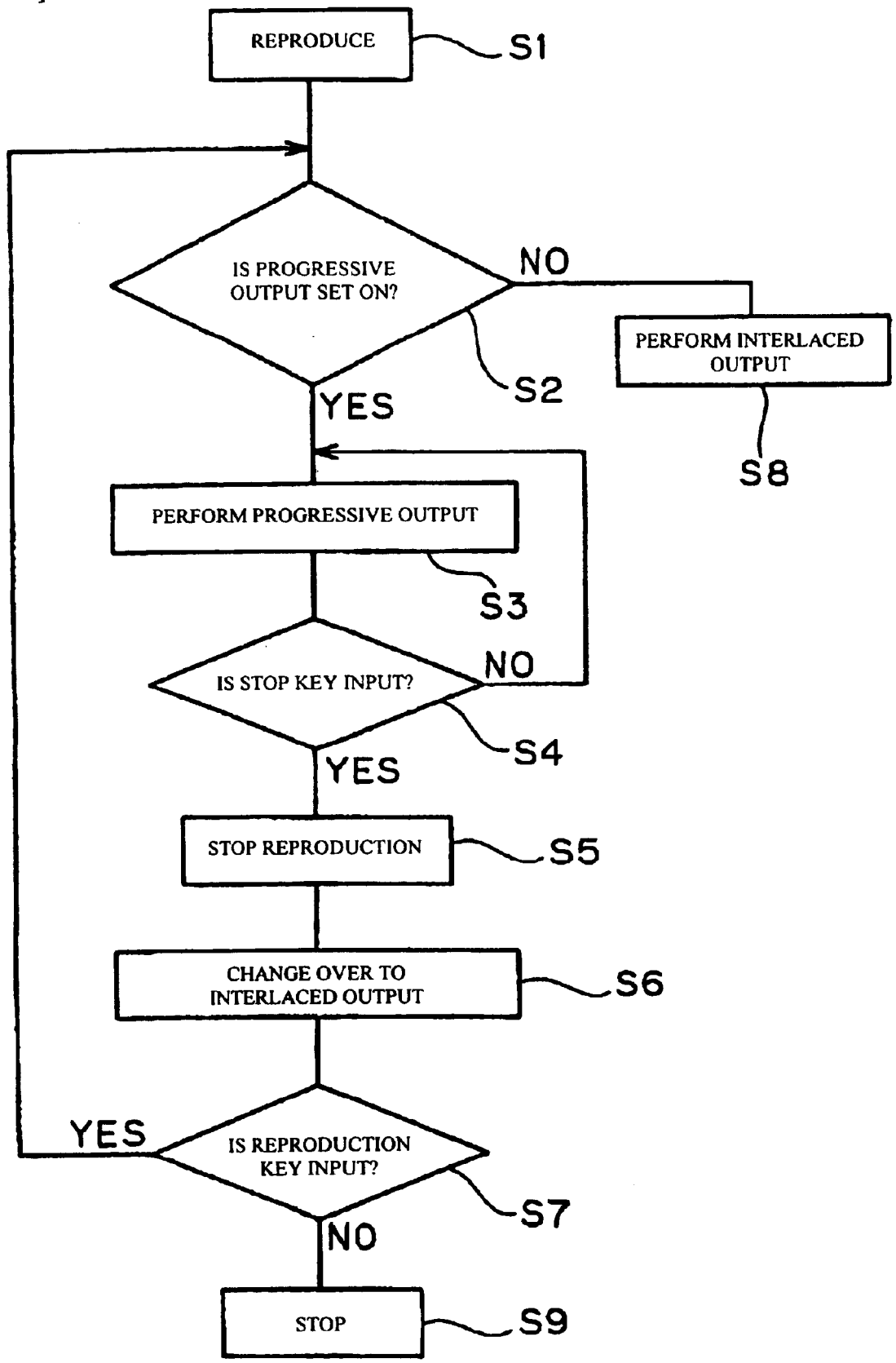

VIDEO REPRODUCTION APPARATUS

BACKGROUND OF THE INVENTION

1. Field of the Invention

The present invention relates to a video reproduction apparatus.

2. Description of the Related Art

There are known a television receiver based on a progressive system and that based on an interlaced system. They differ in an operation method for outputting and displaying a video or the like on a screen of the television receiver.

They also differ in specifications of a video signal or the like for actuating the television receiver. To properly display the video on the screen of the television receiver, it is required that the system of the television receiver correspond to the specifications of the video signal or the like.

Meanwhile, a video reproduction apparatus can reproduce a video recorded on a recording medium and output the video to a television receiver connected to the apparatus. The video reproduction apparatus can also display an operation menu on a screen of the television receiver connected to the apparatus, and input and set conditions for actuating the video reproduction apparatus and the television receiver by user's operation based on this operation menu.

Some video reproduction apparatuses can input and set the system of the television receiver by user's operation based on the operation menu displayed on the screen of the television receiver.

The video reproduction apparatus converts a signal output to the television receiver to a signal corresponding to the progressive system or a signal corresponding to the interlaced system in accordance with the system set by this user's operation. It is thereby possible to make the system of the television receiver correspond to the signal input to the television receiver and to properly actuate the television receiver.

However, the system of the television receiver connected to the video reproduction apparatus does not often correspond to the system set by the user. Namely, the user's erroneous input of the system of the television receiver is a case in it.

If the user erroneously sets the system of the television receiver, the specifications of the signal output from the video reproduction apparatus do not correspond to the system of the television receiver actually connected to the apparatus. As a result, it is disadvantageously impossible to properly actuate the television receiver and display the video on the screen of the television receiver.

SUMMARY OF THE INVENTION

It is, therefore, an object of the present invention to provide a video reproduction apparatus capable of promptly actuating a television receiver and displaying a video or the like by simple operation even if a user erroneously inputs a system of the television receiver.

According to a first aspect of the present invention, there is provided a video reproduction apparatus comprising: video reproduction means for reproducing a video recorded on a recording medium, and for outputting a video signal; an output signal formation portion that serves as first signal formation means for forming an input signal into a first output signal based on a progressive system and that serves as second signal formation means for forming an input signal into a second output signal based on an interlaced system; reproduction operation means for actuating the video reproduction means; and reproduction stop operation means for stopping an operation of the video reproduction means, wherein the video signal output from the video reproduction means is input to the output signal formation portion, and the input video signal is one of the first output signal and the second output signal, one of the first output signal and the second output signal is output to a television receiver connected to the video reproduction apparatus, the video reproduction apparatus further comprises:

a microcomputer that controls the operation of the video reproduction apparatus; and input operation means for displaying an operation menu on a screen of the television receiver, and for setting the input signal inputted to the output signal formation portion in accordance with the type of the television receiver as the first output signal or the second output signal, by performing an input operation based on the display of the operation menu as to whether the television receiver is based on the progressive system or the interlaced system, and if the reproduction stop operation means is operated, the output signal formation portion is controlled to function as the second signal formation means (claim 1).

According to the video reproduction apparatus of the present invention, if user erroneously sets the type of the television receiver connected to the apparatus as the progressive system although the television receiver is based on the interlaced system, the output signal formation portion can temporarily function as the second signal formation means and the input signal inputted to the output signal formation portion can be processed by operating the reproduction stop operation means.

It is thereby possible to display the operation menu on the screen of the television receiver and for the user to correctly reset the type of the television receiver by operating the input operation means. Accordingly, it is possible to promptly actuate the television receiver and display the video reproduced by the video reproduction means on the television receiver.

As can be seen, according to the present invention, if the type of the television receiver is erroneously set, the television receiver can be promptly actuated by simple operation. In addition, by displaying the operation menu on the television receiver and promptly, correctly setting the type of the television receiver, the television receiver can be properly actuated.

Further, a digital versatile disk or DVD can be employed as the recording medium and disk reproduction means for reproducing the DVD can be employed as the video reproduction means (claim 2).

According to the present invention, the video recorded on the DVD can be reproduced and displayed on the television receiver.

BRIEF DESCRIPTION OF THE DRAWINGS

FIG. 1 is a block diagram of a video reproduction apparatus in one embodiment of the present invention;

FIG. 2 illustrates one example of an operation menu displayed on a television receiver; and FIG. 3 is a flow chart which illustrates one example of procedures for actuating the video reproduction apparatus.

DETAILED DESCRIPTION OF THE PREFERRED EMBODIMENT

The embodiment of the present invention will be described hereinafter with reference to FIGS. 1 to 3. FIG. 1 is a block diagram of a video reproduction apparatus 15 in one embodiment of the present invention. The video reproduction apparatus 15 shown in FIG. 1 includes a main body 10 and an operation remote controller 11. A television receiver 17 is connected to the main body 10 of the video reproduction apparatus 15.

The video reproduction apparatus 15 shown in FIG. 1 reproduces a video recorded on a Digital Versatile Disk (hereinafter, "DVD") serving as a recording medium and displays this video on a screen of the television receiver 17.

The main body 10 of the video reproduction apparatus 15 includes a disk reproduction portion 1, an MPEG decoder 2, a video encoder 3, and a microcomputer 5.

The disk reproduction portion 1 reproduces the video recorded on the DVD and outputs a video signal. The disk reproduction portion 1 serves as disk reproduction means for reproducing the video recorded on the DVD. The disk reproduction portion 1 also serves as video reproduction means for reproducing the video recorded on the recording medium and outputting the video signal.

The MPEG decoder 2 decodes the video signal that is a compressed moving image. Namely, the MPEG decoder 2 demodulates the video signal represented by a compression code system to an original video signal. The MPEG decoder 2 inputs the video signal output from the disk reproduction portion 1, decodes and outputs this input video signal.

The video encoder 3 includes a first signal formation circuit 3a and a second signal formation circuit 3b. The first signal formation circuit 3a forms the input signal input to the video encoder 3 into a first output signal based on the progressive system. The first signal formation circuit 3a serves as first signal formation means.

The second signal formation circuit 3b forms the input signal input to the video encoder 3 into a second output signal based on the interlaced system. The second signal formation circuit 3b serves as second signal formation means.

The determination of which the input signal input to the video encoder 3 is input to and processed by, the first signal processing circuit 3a or the second signal processing circuit 3b, is controlled by the microcomputer 5 to be described later.

The video encoder 3 includes signal output terminals 3V, 3U, 3Y, 3C, and 3S for outputting the first output signal or second output signal. The first output signal based on the progressive system is output from the signal output terminals 3V, 3U, and 3Y. The second output signal based on the interlaced system is output from the signal output terminals 3V, 3U, 3Y, 3C, and 3S. An output signal output from one of the signal output terminals of this video encoder 3 is input to the television receiver 17 to be described later.

The video encoder 3 inputs the video signal output from the MPEG decoder 2 as an input signal. If the video signal input to the video encoder 3 is input to and processed by the first signal formation circuit 3a, the video signal is converted to a first output video signal. If the video signal input to the video encoder 3 is input to and processed by the second signal formation circuit 3b, the video signal is converted to a second output video signal.

The first output video signal corresponds to a first output signal and the second output video signal corresponds to a second output signal.

The video encoder 3 also inputs, as an input signal, operation menu display data, output from the microcomputer 5 to be described later, for displaying the operation menu on the screen of the television receiver 17.

If the operation menu display data input to the video encoder 3 is input to and processed by the first signal formation circuit 3a, the data is converted to a first operation menu display signal. If the operation menu display data input to the video encoder 3 is input to and processed by the second signal formation circuit 3b, the data is converted to a second operation menu display signal.

The first operation menu display signal corresponds to a first output signal and the second operation menu display signal corresponds to a second output signal.

The video encoder 3 thus constituted corresponds to an output signal formation portion that forms the input signal into the first output signal by the first signal formation circuit 3a and that forms the input signal into the second output signal by the second signal formation circuit 3b.

The microcomputer 5 controls the operation of the main body 10 of the video reproduction apparatus 15. The microcomputer 5 includes a read-only memory (hereinafter, "ROM") and a random-access memory (hereinafter, "RAM") both of which are not shown in FIG. 1.

The ROM stores an input operation control program for displaying the operation menu on the screen of the television receiver 17 and reading a content input by user's operation based on the displayed operation menu.

The operation menu displayed on the screen of the television receiver 17 contains an item for inputting a type of the television receiver 17. That is, the operation menu contains an item for inputting whether the television receiver 17 is based on the progressive system or the interlaced system.

If a user inputs either the progressive system or the interlaced system based on the operation menu displayed on the screen of the television receiver 17, the input system is read by the input operation control program and set as the system of the television receiver 17.

The microcomputer 5 controls the video encoder 3 in accordance with the system of the television receiver 17 thus set, that is, controls the video encoder 3 to process the input signal input to the video encoder 3 by one of the two signal formation circuits 3a and 3b.

In other words, if the progressive system is set as the system of the television receiver 17, the microcomputer 5 controls the video encoder 3 to process the input signal input to the video encoder 3 by the first signal formation circuit 3a.

If the interlaced system is set as the system of the television receiver 17, the microcomputer 5 controls the video encoder 3 to process the input signal input to the video encoder 3 by the second signal formation circuit 3b.

FIG. 2 illustrates one example of the operation menu displayed on the screen of the television receiver 17. FIG. 2 illustrates, as items of the operation menu, "CLOCK SETTING", "RECORDING RESERVATION", "PROGRESSIVE OUTPUT", and "CHANNEL SETTING".

Among the items of the operation menu shown in FIG. 2, "PROGRESSIVE OUTPUT" is an item for setting the type of the television receiver 17 either as the progressive system or the interlaced system.

In the example of FIG. 2, if the user operates the operation remote controller 11 and selects and inputs one of "ON" and "OFF" of "PROGRESSIVE OUTPUT" by a toggle switch displayed on the screen, the type of the television receiver 17 can be set.

If the user performs the operation of selecting and inputting "ON" of "PROGRESSIVE OUTPUT" based on the operation menu shown in FIG. 2, the progressive system can be set as the type of the television receiver 17.

If the user performs the operation of selecting and inputting "OFF" of "PROGRESSIVE OUTPUT" based on the operation menu shown in FIG. 2, the interlaced system can be set as the system of the television receiver 17.

FIG. 2 illustrates a state in which "PROGRESSIVE OUTPUT" is selected as an operation item and in which "ON" of "PROGRESSIVE OUTPUT" is selected. If the user performs the input operation in this state, the progressive system is set as the system of the television receiver 17.

The ROM of the microcomputer 5 stores a video reproduction control program. The video reproduction control program is part of the program executed by the microcomputer 5 for controlling the operation of this video reproduction apparatus 15. The operation of the video reproduction apparatus 15 for reproducing the video by the disk reproduction portion 1 is controlled by the video reproduction control program.

By executing this video reproduction control program, the circuit that processes the input signal input to the video encoder 3 can be temporarily changed over between the two signal formation circuits 3a and 3b in accordance with procedures of this video reproduction control program for the type of the television receiver 17 set based on the operation menu as will be described later.

Further, the video reproduction apparatus 15 includes the operation remote controller 11 shown in FIG. 1. The operation remote controller 11 includes a power key, a reproduction key, a reproduction stop key, an operation menu display key, and various input operation keys which are not shown in FIG. 1.

The power key is an operation key for turning on or off a power for actuating the video reproduction apparatus 15. The reproduction key is an operation key for actuating the disk reproduction portion 1 and reproducing the video recorded on the DVD. This reproduction key corresponds to reproduction operation means. The reproduction stop key is an operation key for stopping the operation of the disk reproduction portion 1 and stopping reproducing the video. The reproduction stop key corresponds to reproduction stop means.

The operation menu display key is an operation key for displaying the operation menu on the screen of the television receiver 17. The input operation keys are operation keys for inputting various conditions for actuating the video reproduction apparatus 15.

By operating the operation menu display key to display the operation menu on the television receiver 17 and operating part of the operation keys, the system of the television receiver 17 can be selected from one of the progressive system and the interlaced system and set at the selected system.

The video reproduction apparatus 15 includes operation discrimination means, not shown, that discriminates a content that the user operates with the operation remote controller 11. If the operation discrimination means discriminates the content of the operation for the remote controller 11, a signal that represents the content of the operation is output to the microcomputer 5.

As a result, the microcomputer 5 discriminates the content of the operation for the operation remote controller 11 executed by the user, and controls the operation of the video reproduction apparatus 15 in accordance with the content of this operation.

The television receiver 17 based on either the progressive system or the interlaced system can be connected to the video reproduction apparatus 15. If the television receiver 17 is based on the progressive system, the video recorded on the DVD and reproduced by the disk reproduction portion 1 can be output at a higher image quality.

If the second output signal based on the interlaced system is input to the television receiver 17 based on the progressive system for this television receiver 17, the television receiver 17 can be properly actuated and the video or characters can be displayed on the screen of the television receiver 17.

If the first output signal based on the progressive system is input to the television receiver 17 based on the interlaced system, the television receiver 17 cannot be properly actuated and the video or characters cannot be displayed on the screen of the television receiver 17.

Examples of the operation of the video reproduction apparatus 15 stated above will be described while also referring to FIG. 3. FIG. 3 is a flow chart which illustrates an example of part of the operation of the video reproduction apparatus 15. FIG. 3 also illustrates part of a flow chart for the video reproduction control program.

OPERATION EXAMPLE 1

As operation example 1, an instance in which the television receiver 17 based on the interlaced system is connected to the video reproduction apparatus 15 will be described. The user operates the operation remote controller 11, operates the power key, and turns on the power of the video reproduction apparatus 15.

The video reproduction apparatus 15 starts operating accordingly. The microcomputer 5 starts operating, the execution of the program for controlling the video reproduction apparatus 15 is started, and the execution of the input operation control program and the video reproduction control program is started.

Next, the user operates the operation menu display key on the operation remote controller 11 to display the operation menu on the screen of the television receiver 17. Based on the operation menu shown in FIG. 2, the user performs an operation of erroneously inputting "ON" of "PROGRESSIVE OUTPUT". As a result, the progressive system is set as the system of the television receiver 17.

The user then operates the reproduction key on the operation remote controller 11. The disk reproduction portion 1 thereby operates. By operating the reproduction key, the execution of the video reproduction control program the flow chart for which is shown in FIG. 3 is started (in S1). It is determined whether the progressive output is set ON (in S2). If it is detected that the progressive output is set ON ("YES" in S2), the video encoder 3 is controlled to process the input signal by the first signal formation circuit 3a. The video signal reproduced by the disk reproduction portion 1 is thereby processed by the first signal formation circuit 3a and the video encoder 3 outputs the first output video signal based on the progressive system (in S3).

Thereafter, it is determined whether the user has operated the reproduction stop key on the operation remote controller 11 (in S4). Since the television receiver 17 is based on the interlaced system, the video cannot be displayed on the screen based on the first output video signal. Further, in this state, even if the user operates the operation menu display key on the operation remote controller 11, the operation menu cannot be displayed on the screen of the television receiver 17.

If the user operates the reproduction stop key on the operation remote controller 11 because the operation menu cannot be displayed on the screen of the television receiver 17, it is detected that there is an input by the reproduction stop key ("YES" in S4).

Accordingly, the reproduction operation of the disk reproduction portion 1 is stopped (in S5) and the progressive output of the video encoder 3 is changed over to the interlaced output (in S6). Namely, the video encoder 3 is controlled to change over the circuit that processes the input signal from the first signal formation circuit 3a to the second signal formation circuit 3b. As a result, the video encoder 3 outputs the second output signal and the operation menu can be displayed on the screen of the television receiver 17 based on the second output signal.

"OFF" of "PROGRESSIVE OUTPUT" based on the operation menu shown in FIG. 2 is input by user's operation, not shown in FIG. 3, whereby the interlaced system is set as the system of the television receiver 17.

It is determined whether the reproduction key is input (in S7). If it is detected that the reproduction key is input by user's operation of the reproduction key on the operation remote controller 11 ("YES" in S7), the processing returns to S2. The disk reproduction portion 1 operates again by user's operation of the reproduction key.

It is determined whether the progressive output is set ON (in S2). Since the progressive output is set OFF by the user's operation described above, it is detected that the progressive output is set OFF ("NO" in S2) and the video encoder 3 is controlled to process the input signal by the second signal formation circuit 3b.

As a result, the video signal reproduced by the disk reproduction portion 1 is processed by the second signal formation circuit 3b and the second output video signal based on the interlaced system is output from the video encoder 3 (in S8). Thus, the video reproduced by the disk reproduction portion 1 is displayed on the screen of the television receiver 17.

If it is not determined in the step S7 that the reproduction key is input ("NO" in S7), the execution of this video reproduction control program is stopped (in S9).

OPERATION EXAMPLE 2

As operation example 2, an instance in which the television receiver 17 based on the progressive system is connected to the video reproduction apparatus 15 will be described. The user operates the operation remote controller 11, operates the power key, and turns on the power of the video reproduction apparatus 15.

Accordingly, the video reproduction apparatus 15 starts operating. The microcomputer 5 starts operating, the execution of the program for controlling the video reproduction apparatus 15 is started, and the execution of the input operation control program and the video reproduction control program is started.

Next, the user operates the operation menu display key on the operation remote controller 11 to display the operation menu on the screen of the television receiver 17. Based on the operation menu shown in FIG. 2, the user performs an operation of selecting and inputting "ON" of "PROGRESSIVE OUTPUT". As a result, the progressive system is set as the system of the television receiver 17.

The user operates the reproduction key on the operation remote controller 11. The disk reproduction portion 1 thereby operates. By operating the reproduction key, the execution of the video reproduction control program the flow chart for which is shown in FIG. 3 is started (in S1). It is then determined whether the progressive output is set ON (in S2).

If it is detected that the progressive output is set ON ("YES" in S2), the video encoder 3 is controlled to process the input signal by the first signal formation circuit 3a.

As a result, the video signal reproduced by the disk reproduction portion 1 is processed by the first signal formation circuit 3a and the first output video signal based on the progressive system is output from the video encoder 3 (in S3). Thus, the video reproduced by the disk reproduction portion 1 is displayed on the screen of the television receiver 17.

Next, it is determined whether the user has operated the reproduction stop key on the operation remote controller 11 (in S4). If the user operates the reproduction stop key on the operation remote controller 11, it is detected that there is an input by the reproduction stop key ("YES" in S4).

As a result, the reproduction operation of the disk reproduction portion 1 is stopped (in S5) and the progressive output of the video encoder 3 is changed over to the interlaced output (in S6). That is, the circuit of the video encoder 3 that processes the input signal is changed over to the second signal formation circuit 3b.

It is noted that even if the progressive output of the video encoder 3 is changed over to the interlaced output, the operation menu can be displayed on the screen of the television receiver 17 based on the second output signal output from the video encoder 3.

It is then determined whether the reproduction key is input (in S7). If it is detected that the user operates the reproduction key on the operation remote controller 11 and the reproduction key is input ("YES" in S7), the processing returns to the step S2. In addition, the disk reproduction portion 1 operates again by the user's operation of the reproduction key.

It is then determined whether the progressive output is set ON (in S2). If the progressive output is set ON by the user's initial operation based on the operation menu, it is detected that the progressive output is set ON ("YES" in S2) and the video encoder 3 is controlled to process the input signal by the first signal formation circuit 3a.

If it is not detected in the step S7 that the reproduction key is input ("NO" in S7), the execution of this video reproduction control program is stopped (in S9).

According to the video reproduction apparatus 15 described so far, if the type of the television receiver 17 connected to the apparatus 15 is erroneously set at the progressive system although the television receiver 17 is based on the interlaced system, the system of the output signal output to the television receiver 17 from the video reproduction apparatus 15 can be temporarily changed over from the progressive system to the interlaced system by simple operation.

It is thereby possible to display the operation menu on the screen of the television receiver 17 and correctly reset the system of the television receiver 17 based on the operation menu. Accordingly, it is possible to promptly actuate the television receiver 17 and display the video reproduced by the disk reproduction portion 1.

The example of the apparatus that reproduces the video recorded on the DVD has been described as the vide reproduction apparatus 15. The apparatus that employs the DVD as the recording medium is preferably used as the video reproduction apparatus 15 since the video at a higher image quality can be reproduced.

To work the present invention, the video reproduction apparatus that employs the recording medium other than the DVD may be constituted. If the recording medium other than the DVD is employed, the recording medium that records the video by a digital signal is preferable. This is because the video at a high image quality can be reproduced.

If the recording medium other than the DVD is employed, video reproduction means corresponding to the employed recording medium is provided in place of the disk reproduction portion 1 in the video reproduction apparatus.

The example of providing the two signal formation circuits; the first signal formation circuit 3a and the second signal formation circuit 3b so as to allow the output signal formation portion 3 to function as the first signal formation means and the second signal formation means has been described.

To work the present invention, one signal formation circuit for forming the first output signal and the second output signal may be provided in the output signal formation portion 3 and the microcomputer 5 may control the one signal formation circuit to function as either the first signal formation means or the second signal formation means.

According to the video reproduction apparatus of the present invention, if the user performs an operation of erroneously setting the system of the television receiver at the progressive system, the system of the output signal output to the television receiver can be temporarily changed over to the interlaced system by simple operation.

It is thereby possible to display the operation menu for inputting the system of the television receiver on the screen of the television receiver and correctly reset the system of the television receiver. Accordingly, it is possible to have the television receiver actuate promptly and to output the video reproduced by the video reproduction apparatus to the television receiver.

What is claimed is:

1. A video reproduction apparatus comprising:

video reproduction means for reproducing a video recorded on a recording medium, and for outputting a video signal;

an output signal formation portion that serves as first signal formation means for forming an input signal into a first output signal based on a progressive system and that serves as second signal formation means for forming an input signal into a second output signal based on an interlaced system;

reproduction operation means for actuating the video reproduction means; and reproduction stop operation means for stopping an operation of the video reproduction means, wherein the video signal output from the video reproduction means is input to the output signal formation portion, and the input video signal is one of the first output signal and the second output signal, one of the first output signal and the second output signal is output to a television receiver connected to the video reproduction apparatus, the video reproduction apparatus further comprises:

a microcomputer that controls the operation of the video reproduction apparatus; and input operation means for displaying an operation menu on a screen of the television receiver, and for setting the input signal inputted to the output signal formation portion in accordance with the type of the television receiver as the first output signal or the second output signal, by performing an input operation based on the display of the operation menu as to whether the television receiver is based on the progressive system or the interlaced system, and if the reproduction stop operation means is operated, the output signal formation portion is controlled to function as the second signal formation means.

2. The video reproduction apparatus according to claim 1, wherein the recording medium is a digital versatile disk or DVD and the video reproduction means is disk reproduction means for reproducing the DVD.

* * * * *